March 3, 1931.  J. J. WILT  1,794,815
LIQUID GAUGE
Filed April 22, 1929
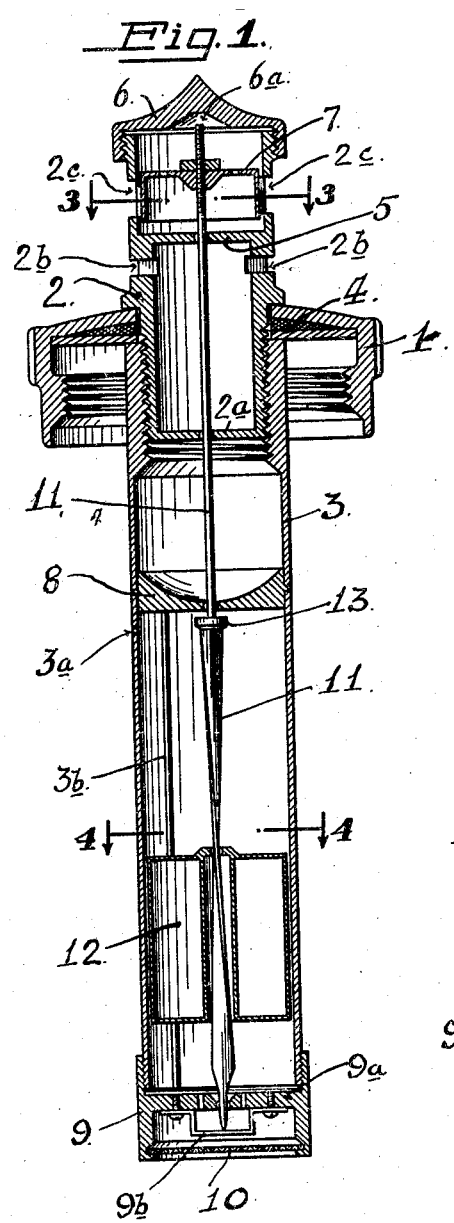
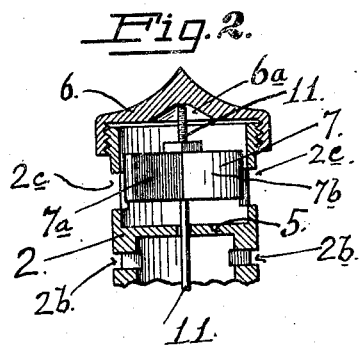
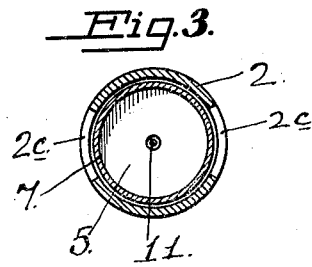
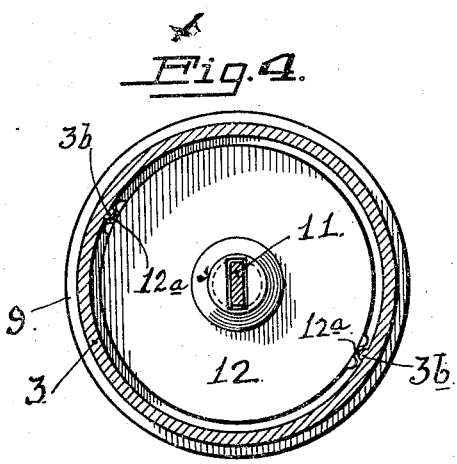
INVENTOR
John J. Wilt
BY Booth & Booth
ATTORNEYS.

Patented Mar. 3, 1931

1,794,815

UNITED STATES PATENT OFFICE

JOHN J. WILT, OF BAKERSFIELD, CALIFORNIA

LIQUID GAUGE

Application filed April 22, 1929. Serial No. 357,012.

My invention relates in general to gauges for indicating liquid level, and in particular to the type of float operated indicators.

The object of my invention is to provide a simple and effective gauge, especially applicable to the radiators of water-cooled internal combustion engines, in that it is capable of convenient association with the radiator filling cap, and is also adapted not only to take care of escaping steam, but also to take advantage of the internal pressure when the water is boiling, to cause the gauge to disclose this fact in addition to its indication of the liquid level.

To this end, my invention consists, in association with and fitted to the cap of the filling opening of a liquid container, for example, a water-cooled radiator of an internal combustion engine, of an indicator member, and float actuated means for effecting distinctive changes of position of said member informative both of volume and pressure condition of the liquid.

It also consists in the novel construction, arrangement and combination of parts comprising the gauge, as I shall hereinafter fully explain, by reference to the accompanying drawings, in which I have shown my gauge in its preferred form, it being understood that changes may be made in details thereof without departing from the spirit of the invention as defined in the claims hereunto appended.

In the drawings

Fig. 1 is a vertical section of my gauge.

Fig. 2 is a sectional detail showing the indicator in elevation, in order to disclose the informative zones on its periphery, and lifted to indicate pressure.

Fig. 3 is a cross section on the line 3—3 of Fig. 1.

Fig. 4 is a cross section, enlarged, on the line 4—4 of Fig. 1.

1 is a cap such as is used to cover the filling opening of a container, for example, the radiator of a water-cooled combustion engine. 2 is a tubular nipple, the lower end of which passes through the cap 1, and has fitted to it, in alignment therewith, the float-housing cylinder 3. Gaskets 4 in number and nature suitable for the purpose complete the joint between the several parts.

The lower end of the nipple is closed by a cross baffle 2a and in the nipple wall above the cap are vents 2b, above which is a cross partition or baffle 5. The top of the nipple is closed by a screw cap 6 having a central guide socket 6a. In the wall of the nipple between the screw cap 6 and the baffle 5 are the sight openings 2c, one in front and one behind. Within the space or chamber formed between the cap 6 and the baffle 5 is an indicator 7, in the form of a disk, bearing upon its periphery the necessary informative indicia. A color difference, such as alternate red 7a and white 7b, as shown in Fig. 2, is preferred, arranged in quarter zones. These color zones appear in registry with the sight openings 2c as the indicator disk turns on its axis.

In the wall of the float housing cylinder 3 is a vent 3a. There is also a cross partition or baffle 8 within said cylinder. The lower end of the cylinder is fitted with a foot cap 9, the upper end of which is closed at 9a. Its lower end is fitted with a screen 10 to exclude sediment. Within the foot-cap 9 is an open-sided depressed bearing strip 9b.

11 is a shaft. Its foot passes slidably and rotatably through the closed upper end 9a of the foot cap 9 and is freely stepped in the depressed bearing strip 9b. Its head freely enters and has vertical play in the socket 6a of the head screw-cap 6 of the nipple 2. Intermediate its head and foot, the shaft passes through the cross baffle 8 of the float housing cylinder 3, through the closed baffle end 2a of the nipple 2, and through cross baffle 5 of said nipple, in all of which it is both rotatable and axially slidable and devoid of stuffing boxes. The indicator disk 7 is fixed upon the shaft 11, and rotates therewith.

The shaft is of cylindrical section from its head down to a point below the cross baffle 8, and thence to its foot its section is flat and has a quarter twist.

12 is a float within the housing cylinder 3, adapted for vertical movement due to the varying liquid level, but it is locked against rotation on its axis by a suitable slide connection with the housing cylinder, as, for example, the ribs 3b on the cylinder and the grooves 12a in the float. The float is slideably fitted upon and engages the twisted section of the shaft 11, thus providing for the rotation of the shaft by the rise and fall of the float. Upon shaft 11, below the cross baffle 8 is a collar which forms a valve 13 adapted by an axial movement of the shaft to close the passage or port in the baffle 8.

In the operation of the device, the level and consequent volume of water in the radiator is indicated by the turning of the disk 7, due to the rotation of the shaft 11 occasioned by the vertical movement of the float 12, the white and red zones on the disk showing the rise and fall of the water level.

In cases where the water becomes hot, as in the radiators of water cooled internal combustion engines, the matter of preventing steam and water blow-off from following the emerging indicator-operating shaft, is to be taken into consideration; and in this connection the most obvious solution is a stuffing-box. I have found, however, that bearings formed by the relatively free passage of the shaft through a plurality of baffle plates, such as the baffles 8, 2a and 5 here shown, taken in connection with the valve 13 controlling the passage through the lowest baffle, is a simple and efficient expedient and is less likely to clog or get out of order. Especially is it efficient, and even quite necessary, for my additional object herein of providing for and insuring the axial movement of the shaft 11 in order to give to the indicator disk 7 a second distinctive position as I shall now explain. When the water boils, the pressure within the radiator acting through the float 12 and the valve 13 lifts the shaft 11 thereby not only closing the valve against the lowest baffle, but also lifting the indicator disk 7 slightly, but sufficiently to recognize the positional change and thereby know that the water is boiling. This elevated or second position is shown in Fig. 2. The depressed open sided step 9b for the lower end of the shaft 11 permits flushing to keep it clear, and in connection with the screen 10 insures the proper freedom from accumulation of sediment, which is desirable in gauging radiator water. The upper baffle 5 in connection with the underlying vents 2b, for the escape of any steam which may pass the baffles, provides for a protected chamber in which the indicator disk 7 is housed.

I claim:—

1. A liquid level gauge comprising a liquid container cap; a tubular nipple and a housing cylinder fitted to and through said cap in connected alignment; a rotatable, axially movable shaft within said nipple and cylinder; a cross baffle plate in said cylinder, through which the shaft freely passes; a valve on the shaft adapted by the axial movement of said shaft, to close and open the passage through the baffle plate; an indicator disk fixed on the shaft within the nipple; a float in the housing cylinder; and means dependent upon the rise and fall of said float to rotate and axially move said shaft.

2. A liquid level gauge comprising a liquid container cap; a tubular nipple and a housing cylinder fitted to and through said cap in connected alignment, said nipple having vents above the cap; a rotatable, axially movable shaft within said nipple and cylinder; a plurality of cross baffle plates through which the shaft freely passes; a valve on the shaft to close and open the passage through the lowermost baffle plate; an indicating disk fixed to said shaft within a chamber formed by the uppermost baffle plate in the upper portion of the nipple above the nipple vents; a float in the housing cylinder; and means dependent upon the rise and fall of said float to rotate and axially move said shaft.

3. A liquid level gauge comprising a liquid container cap; a tubular nipple and a housing cylinder fitted to and through said cap in connected alignment, said nipple having vents; a head cap on said nipple; a foot member on said cylinder having a depressed open sided step bearing and a bottom screen; a shaft mounted between said head cap and said step bearing for rotative and axial movement; a plurality of cross baffle plates through which the shaft freely passes; a valve on the shaft to close and open the passage through the lowermost baffle plate; an indicating disk fixed to said shaft within a chamber formed by the uppermost baffle plate in the upper portion of the nipple above the nipple vents; a float in the housing cylinder; and means dependent upon the rise and fall of said float to rotate and axially move said shaft.

4. A liquid level gauge comprising an indicator; a shaft to which said indicator is fixed, said shaft being mounted for rotative and axial movement; means dependent upon the respective movements of said shaft to effect respective distinctive positional changes of said indicator; a float; and means dependent upon the rise and fall of said float to rotate and axially move said shaft.

In testimony whereof I have signed my name to this specification.

JOHN J. WILT.